(12) United States Patent
Venkataramani et al.

(10) Patent No.: US 7,739,873 B2
(45) Date of Patent: Jun. 22, 2010

(54) GAS TURBINE ENGINE COMBUSTOR HOT STREAK CONTROL

(75) Inventors: Kattalaicheri Srinivasan Venkataramani, West Chester, OH (US); William Joseph Myers, Jr., West Chester, OH (US); Robert Joseph Orlando, West Chester, OH (US); Paul Cooker, Finneytown, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 916 days.

(21) Appl. No.: 11/256,786

(22) Filed: Oct. 24, 2005

(65) Prior Publication Data

US 2007/0089424 A1 Apr. 26, 2007

(51) Int. Cl.
*F02C 9/00* (2006.01)
(52) U.S. Cl. .................................. 60/773; 60/39.281
(58) Field of Classification Search .............. 60/39.091, 60/39.281, 734, 739, 746, 772, 773, 776, 60/779
See application file for complete search history.

(56) References Cited

U.S. PATENT DOCUMENTS

| | | | |
|---|---|---|---|
| 4,115,998 A | 9/1978 | Gilbert et al. | |
| 5,117,637 A | 6/1992 | Howell et al. | |
| 6,554,562 B2 | 4/2003 | Dudebout et al. | |
| 6,640,199 B1 | 10/2003 | Goldstein et al. | |
| 6,755,024 B1 | 6/2004 | Mao et al. | |
| 6,775,986 B2 * | 8/2004 | Ganz et al. | 60/39.281 |
| 6,857,272 B2 | 2/2005 | Summerfield et al. | |
| 2003/0014979 A1 | 1/2003 | Summerfield et al. | |
| 2004/0024516 A1 | 2/2004 | Hook et al. | |
| 2004/0206091 A1 | 10/2004 | Yee et al. | |
| 2004/0221582 A1 | 11/2004 | Howell et al. | |
| 2004/0227928 A1 | 11/2004 | Bonne et al. | |
| 2005/0081528 A1 | 4/2005 | Howell et al. | |
| 2005/0144955 A1 | 7/2005 | Handelsman et al. | |
| 2005/0180699 A1 | 8/2005 | Shu et al. | |

* cited by examiner

*Primary Examiner*—Michael Cuff
*Assistant Examiner*—Phutthiwat Wongwian
(74) *Attorney, Agent, or Firm*—William Scott Andes; Steven J. Rosen

(57) ABSTRACT

A gas turbine engine combustion system includes a plurality of fuel injectors circumferentially disposed around a combustor in a one to one fuel supply relationship with a plurality of fuel nozzle valves, and an electronic controller for controlling the fuel nozzle valves to eliminate and/or reduce hot streaking in response to sensed hot streak conditions. The fuel nozzle valves may be modulating valves. The electronic controller may be used to individually control the fuel nozzle valves. The hot streak conditions may be sensed with temperature sensors such as temperature sensors operably mounted in the combustor. A program in the electronic controller may be used for determining broken or malfunctioning sensors by calculating a combustor temperature and comparing it to measured temperatures from the sensors and comparing the measured fuel pressures in the individual fuel nozzle circuits with the simulated or calculated fuel pressures.

13 Claims, 2 Drawing Sheets

GAS TURBINE ENGINE COMBUSTOR HOT STREAK CONTROL

BACKGROUND OF THE INVENTION

Field of the Invention

The present invention relates generally to gas turbine engine combustors and, more particularly, methods and apparatus for controlling hot streaks in the combustors.

Gas turbine engines having annular combustors typically have a dome from which radially inner and outer combustor liners extend downstream defining a combustion zone therebetween. An annular array of carburetors or fuel nozzles, including fuel injectors and air mixers (swirlers), are disposed through holes in the dome. Fuel flow through each of the nominally identical carburetors and fuel injectors has some variation from the mean. This variation may stem from manufacturing tolerances, gradients in the fuel manifold pressure or obstructions due to coking, etc. This variation is a circumferential variation around the combustor dome and combustor.

High pressure turbine nozzles located downstream of the combustor are subjected to circumferential variations of combustion gas temperatures depending on the relative location of the turbine nozzle and its circumferentially aligned fuel nozzle. The variation of turbine nozzle temperature can be very significant and these temperature variations are quite difficult to predict. Therefore, for the engine durability, the turbine nozzles are typically designed to withstand the highest possible gas temperature, namely what is referred to in the gas turbine industry as hot streak condition. Some of the turbine nozzles are not exposed to such hot streak temperatures and, therefore, these nozzles will become excessively cooled and the extra cooling air for those lower temperature turbine nozzles becomes unnecessary.

The cooling air used in HP turbine nozzle is taken from the compressor bypassing the combustor and is costly in terms of engine efficiency. The greater amount of cooling air used in turbine nozzles results in less air available for combustion and higher combustion temperature and potentially higher unwanted NOx emission. In addition, non-uniformity in fuel flows between fuel nozzles leads to locally richer fuel/air ratios downstream of those nozzles having excess fuel. In turn, the local flame temperature and NOx production are increased. Therefore, it is desirable to have a gas turbine combustion system that can minimize the hot streak temperature and lower the cooling air consumption in the turbine nozzle.

BRIEF DESCRIPTION OF THE INVENTION

Apparatus and method of operating a gas turbine engine combustion system includes a plurality of fuel injectors circumferentially disposed around a combustor, a plurality of fuel nozzle valves in a one to one fuel supply relationship with the fuel injectors, and an electronic controller controllably connected to the fuel nozzle valves for individually controlling the fuel nozzle valves to eliminate and/or reduce hot streaking in response to sensed hot streak conditions. An exemplary embodiment of the gas turbine engine combustion system includes sensing the hot streak conditions with temperature sensors such as optical sensors operably mounted in the combustor to measure gas temperatures in the combustor.

The electronic controller may be controllably connected to the fuel nozzle valves to individually control all of the nozzle valves in response to the hot streak conditions calculated by the electronic controller using input from the temperature sensors. A condition monitoring & fault accommodation program stored in the electronic controller may be used for determining if the temperature sensors are broken or malfunctioning by calculating or simulating a combustor temperature and comparing it to measured temperatures from the temperature sensors and by comparing the measured fuel pressures in the individual fuel nozzle circuits with the simulated or calculated fuel pressures.

DETAILED DESCRIPTION OF THE INVENTION

Figure 1:
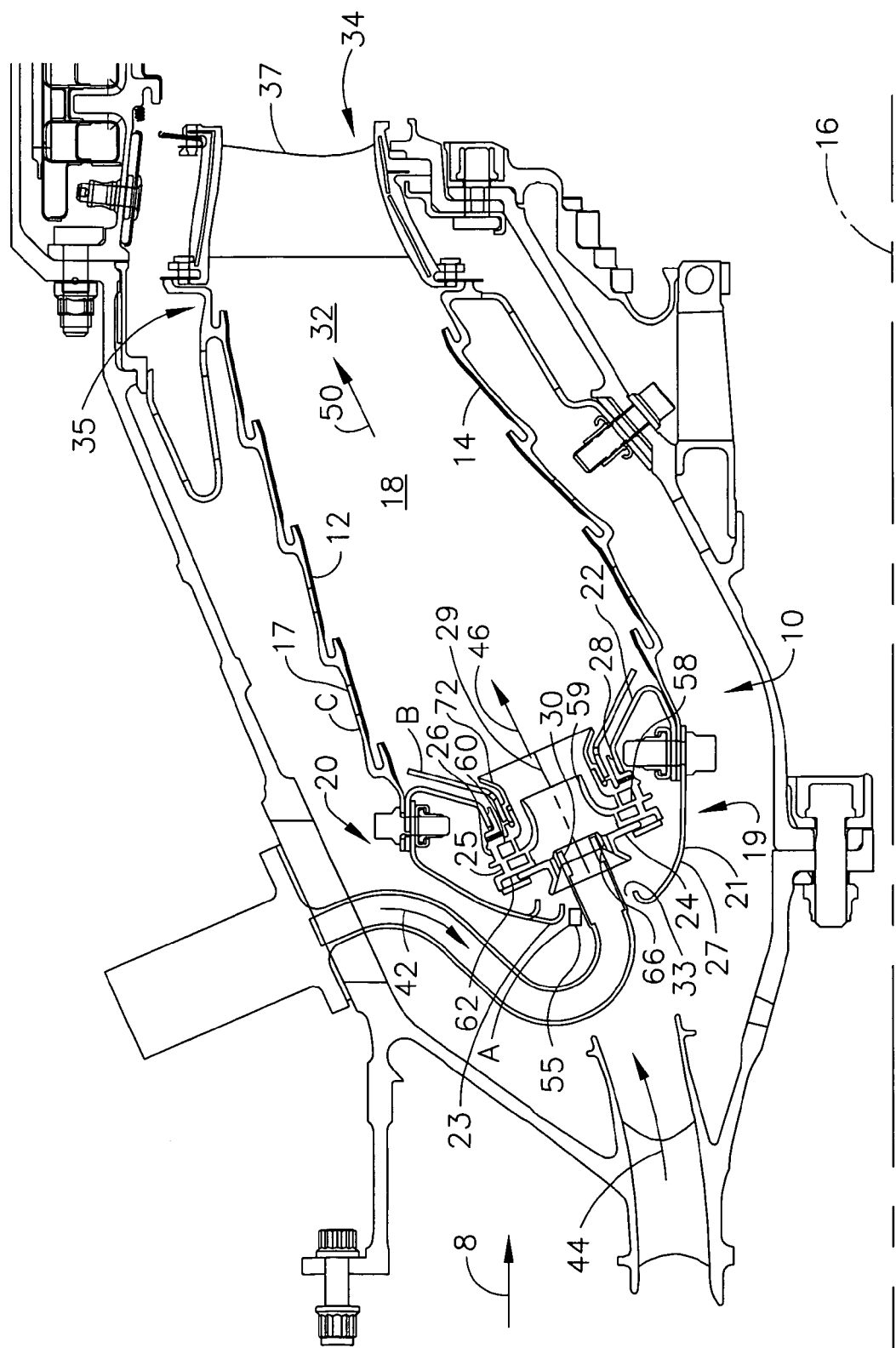
FIG. 1 is an illustration of a gas turbine engine combustor including an exemplary embodiment of apparatus for controlling hot streaks in the combustor using a hot streak control system.

Illustrated in FIG. 1 is an exemplary embodiment of a gas turbine engine combustor 10 disposed about a centerline 16 and having a combustor dome assembly 20 at an upstream end 19 of the combustor 10. The dome assembly 20 includes an annular combustor dome 21 with an annular dome plate 22. The combustor 10 includes a pair of film-cooled radially outer and inner annular liners 12 and 14 disposed about a longitudinal engine centerline 16 and extending or in a downstream direction 8. The outer and inner liners 12 and 14 include dilution holes 17 and are radially spaced from each other, thus, define a combustion zone 18 therebetween. The outer and inner liners 12 and 14 extend downstream from the annular dome plate 22.

The combustor dome assembly 20 includes a plurality of circumferentially spaced apart carburetors 24 disposed through corresponding circular plate openings 28 in the dome plate 22. Each of the carburetors 24 includes forward and aft air swirlers 25 and 26, respectively, circumscribed about a longitudinal carburetor axis 29. The forward and aft air swirlers 25 and 26 are also referred to primary and secondary swirlers, respectively. The aft swirler 26 includes a septum 58 which defines a primary venturi 59, a plurality of circumferentially spaced aft swirl vanes 60, and an annular exit flare 72. The forward swirler 25 centrally supports a ferrule 66 which slidably supports a fuel injector 30 therein. The forward swirler 25 has a plurality of circumferentially spaced forward swirl vanes 62. The fuel injector 30 and the aft swirler 26 are disposed coaxially with the carburetor axis 29. Radially outer and inner combustor cowlings 23 and 27 extend forward and upstream of and are attached to the annular dome plate 22. The outer and inner combustor cowlings 23 and 27 have an annular opening 33 therebetween which allows compressed air 44 to pass on to and through the carburetors 24 and through the dilution holes 17 in the outer and inner liners 12 and 14 and into the combustion zone 18 therebetween.

The combustor 10 includes, at its downstream end 35, an annular combustor outlet 32 and is conventionally connected to a conventional turbine nozzle 34, which includes a plurality of circumferentially spaced nozzle vanes 37. In operation, fuel 42 is conventionally channeled through to the injector 30 and discharged therefrom into the primary venturi 59 and center of forward and aft air swirlers 25 and 26 wherein it is mixed with a portion of the compressed air 44 conventionally provided to the combustor 10 from a compressor (not shown). The swirlers 25 and 26 are effective for mixing the fuel 42 and the air 44 for creating a fuel/air mixture 46, which is discharged into the combustion zone 18, where it is conventionally ignited during start up by a conventional igniter (not shown) disposed through the outer liner 12 or by the ongoing combustion process when the igniter is off and the engine is operating.

Combustion gases 50 are generated in and channeled from the combustion zone 18 to the combustor outlet 32, to the turbine nozzle 34, and then to turbine stages (not shown) which extract energy therefrom for powering compressor and fan stages of the engine disposed upstream of the combustor 10. Circumferential variations in combustion gas temperatures around the turbine nozzle 34 can reduce engine durability so the turbine nozzles are typically designed to withstand the highest possible gas temperature which is referred to in the gas turbine industry as hot streak temperature. In order to reduce the amount of cooling air used to counter the hot streak effect or condition and lower the hot streak temperature, a gas turbine combustion system 40, schematically illustrated in FIG. 2, is provided to reduce the hot streak temperature and reduce or eliminate hot streaking between the nozzle vanes 37 in the turbine nozzle 34.

Figure 2:
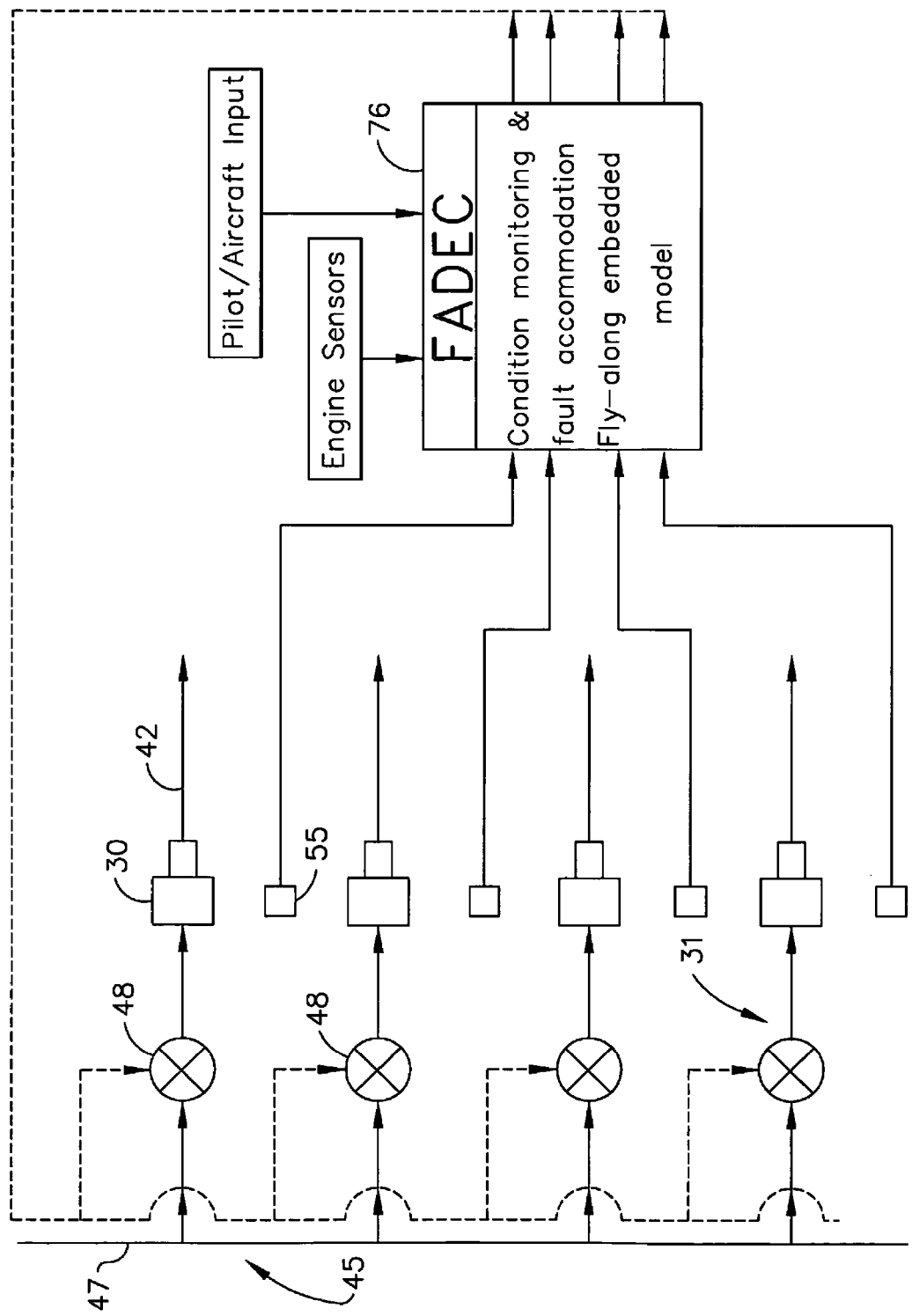
FIG. 2 is a schematical view illustration of the hot streak control system illustrated in FIG. 1.

Schematically illustrated in FIG. 2 is an exemplary embodiment of the hot streak temperature reducing gas turbine combustion system 40 including a gas turbine engine fuel supply system 45 that provides fuel to the fuel injectors 30. Each of the fuel injectors 30 is connected to a fuel supply manifold 47 through an individual fuel nozzle circuit 31. A fuel nozzle valve 48 is disposed between the fuel supply manifold 47 and each of the fuel injectors 30. The fuel nozzle valves 48 may be on/off valves or they may be modulating valves capable of varying or modulating fuel flow to the fuel injectors 30. A means for sensing the hot streak conditions is operably mounted in the combustor 10 to measure gas temperatures in the combustor 10. The means may be temperature sensors 55 and, more particularly, the temperature sensors 55 may be optical temperature sensors.

The temperature sensors 55 are connected in signal supply relationship to an electronic controller 76. The electronic controller 76 is controllably connected to the fuel nozzle valves 48 for controlling the fuel nozzle valves 48 to eliminate and/or reduce hot streaking. The exemplary embodiment of the hot streak temperature reducing gas turbine combustion system 40 illustrated herein has the electronic controller 76 controllably connected to the fuel nozzle valves 48 for individually controlling all of the fuel nozzle valves 48, i.e. each one of the fuel nozzle valves 48 is controlled separately, to eliminate and/or reduce hot streaking in response to the sensed hot streak conditions.

The temperature sensors 55 operably mounted in the combustor 10 serve to measure the gas temperatures of a combustor flame downstream of each of the carburetors 24 in the combustion zone 18 as illustrated in FIG. 1. The temperature sensors 55 may be mounted in many axial and radial positions in the combustor 10. Exemplary first, second, and third positions A, B, and C are illustrated in an axial radial plane of the engine in FIG. 1. The exemplary first positions A are in proximity of the fuel injector 30 within the outer and inner combustor cowlings 23 and 27, one temperature sensor 55 is disposed in proximity of each one of the fuel injectors 30. The exemplary second and third positions B and C are located in the annular dome plate 22 and outer liner 12, respectively. The temperature sensors are also distributed circumferentially around the combustor 10, for example, at substantially the same circumferential location as each of the carburetors 24.

The hot streak temperature reducing gas turbine combustion system 40 is controlled by the electronic controller 76 which may be a full authority digital electronic controller (FADEC) well known in the industry for controlling the operation of gas turbine engines. The FADEC receives input from the temperature sensors 55 and if it senses and determines an unwanted hot streak condition in the combustor 10 it adjusts circumferential fuel flow distribution by varying the amount of fuel passing through one or more of the fuel nozzle valves 48 and to a respective one of the fuel injectors 30. A condition monitoring & fault accommodation fly-along embedded model program is stored in the FADEC. It is an engine simulation computer program that runs in real time simulating the gas turbine engine's operation and calculating simulated combustor temperatures.

Inputs for the model come from various speed, temperature, pressure and position sensors in the engine. The FADEC compares the simulated combustor temperatures from the model to measured temperatures from the temperature sensors 55 and the simulated fuel pressures in the fuel nozzles with the measured fuel pressures in the individual fuel nozzle circuits 31. The FADEC determines or senses a broken or malfunctioning sensor from the two comparisons. Broken or malfunctioning sensors are accommodated by using a calculated or simulated combustor temperature from a simulation sub-model computer program in the condition monitoring & fault accommodation fly-along embedded model computer program. Output from the various combustion gas temperature monitoring temperature sensors 55 is fed to the model and when it senses a hot streak or a large local deviation in local temperature it instantaneously locates the variant fuel injector(s) 30 and adjust the fuel flows to the variant fuel injector(s) 30 in order to minimize the circumferential temperature variation in the combustor sensed by the FADEC. When the hot streak temperature reducing gas turbine combustion system 40 detects an undesirable situation, hot streak conditions, and corrects it by changing the fuel flow it also makes sure that the direction and rate of change in the fuel flow to the fuel injector(s) 30 are appropriate.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A gas turbine engine combustion system comprising:
   a plurality of fuel injectors circumferentially disposed around a combustor,
   a plurality of fuel nozzle valves in a one to one fuel supply relationship with the fuel injectors,
   an electronic controller controllably connected to the fuel nozzle valves for individually controlling the fuel nozzle valves to eliminate and/or reduce hot streaking between nozzle vanes in a turbine nozzle immediately downstream of the combustor in response to sensed hot streak conditions in a combustion zone of the combustor,
   the means for sensing the hot streak conditions including temperature sensors operably mounted in the combustor to measure gas temperatures in a combustion zone in the combustor and connected in signal supply relationship to the electronic controller controllably connected to the fuel nozzle valves to individually control the fuel nozzle valves in response to hot streak conditions calculated by the electronic controller using input from the sensors, at least some of the temperature sensors mounted in one or more positions chosen from a group of first, second, and third positions, and the first position being in proximity of at least one of the fuel injectors within outer and inner combustor cowlings of the combustor, the second position being in an annular dome plate of the combustor, and the third position being in an outer liner of the combustor.

2. A system as claimed in claim 1 further comprising a condition monitoring & fault accommodation program stored in the electronic controller for determining if the sensors are broken or malfunctioning by calculating or simulating a combustor temperature and comparing it to measured temperatures from the sensors and by comparing measured fuel pressures in individual fuel nozzle circuits with simulated or calculated fuel pressures.

3. A gas turbine engine combustion system comprising:
a plurality of fuel injectors circumferentially disposed around a combustor,
a plurality of fuel nozzle valves in a one to one fuel supply relationship with the fuel injectors,
temperature sensors operably mounted in the combustor to measure gas temperatures in the combustor,
at least some of the temperature sensors mounted in one or more positions chosen from a group of first, second, and third positions,
the first position being in proximity of at least one of the fuel injectors within outer and inner combustor cowlings of the combustor, the second position being in an annular dome plate of the combustor, and the third position being in an outer liner of the combustor, and
an electronic controller controllably connected to the fuel nozzle valves for individually controlling the fuel nozzle valves to eliminate and/or reduce hot streaking between nozzle vanes in a turbine nozzle immediately downstream of the combustor in response to sensed hot streak conditions indicated at least in part by the temperature sensors in a combustion zone of the combustor.

4. A system as claimed in claim 3 further comprising the electronic controller controllably connected to the fuel nozzle valves to individually control the fuel nozzle valves for controlling the fuel nozzle valves to eliminate and/or reduce hot streaking in response to sensed hot streak conditions indicated at least in part by the temperature sensors.

5. A system as claimed in claim 4 wherein the fuel nozzle valves are modulating valves capable of varying or modulating of fuel flow to the fuel injectors.

6. A system as claimed in claim 5 further comprising a condition monitoring & fault accommodation program stored in the electronic controller for determining if the sensors are broken or malfunctioning by calculating or simulating a combustor temperature and comparing it to measured temperatures from the temperature sensors and by comparing measured fuel pressures in individual fuel nozzle circuits with simulated or calculated fuel pressures.

7. A system as claimed in claim 6 further comprising gas turbine engine speed, temperature, and pressure sensors in signal supply relationship to the electronic controller and operable to supply input to the condition monitoring & fault accommodation program for the calculating or simulating a combustor temperature and comparing it to measured temperatures from the temperature sensors.

8. A method for controlling gas turbine engine combustion system to eliminate and/or reduce hot streaking in a turbine nozzles immediately downstream of a combustor, the method comprising:
supplying fuel to a plurality of fuel injectors circumferentially disposed around a combustor and igniting and combusting the fuel in the combustor,
controlling the amount of fuel supplied to the fuel injectors with a plurality of fuel nozzle valves in a one to one fuel supply relationship with the fuel injectors,
controlling the amount of fuel supplied to each one of the fuel injectors with an electronic controller controllably connected to the fuel nozzle valves to eliminate and/or reduce hot streaking between nozzle vanes in a turbine nozzle immediately downstream of the combustor,
wherein the sensing hot streaking conditions includes measuring gas temperatures in the combustor with temperature sensors operably mounted in the combustor,
at least some of the temperature sensors mounted in one or more positions chosen from a group of first, second, and third positions, and
the first position being in proximity of at least one of the fuel injectors within outer and inner combustor cowlings of the combustor, the second position being in an annular dome plate of the combustor, and the third position being in an outer liner of the combustor.

9. A method as claimed in claim 8 wherein the fuel nozzle valves are modulating valves capable of varying or modulating fuel flow to the fuel injectors and further comprising modulating of fuel flow to the fuel injectors for controlling the amount of fuel supplied to each one of the fuel injectors.

10. A method as claimed in claim 9 further comprising individually controlling the fuel nozzle valves to eliminate and/or reduce hot streaking.

11. A method as claimed in claim 10 further comprising operating a condition monitoring & fault accommodation program stored in the electronic controller to determine if the sensors are broken or malfunctioning by calculating or simulating a combustor temperature and comparing it to measured temperatures from the sensors and by comparing measured fuel pressures in individual fuel nozzle circuits with simulated or calculated fuel pressures.

12. A method as claimed in claim 10 wherein the sensing hot streaking conditions includes optically measuring gas temperatures with optical temperature sensors operably mounted in the combustor.

13. A method as claimed in claim 12 further comprising operating a condition monitoring & fault accommodation program stored in the electronic controller to determine if the temperature sensors are broken or malfunctioning by calculating or simulating a combustor temperature and comparing it to measured temperatures from the temperature sensors and by comparing measured fuel pressures in individual fuel nozzle circuits with simulated or calculated fuel pressures.

\* \* \* \* \*